*INVENTORS,*
WILLIAM HOWARD HAMILTON
SCOTT CAUSEY HAMPTON, JR.,
BY

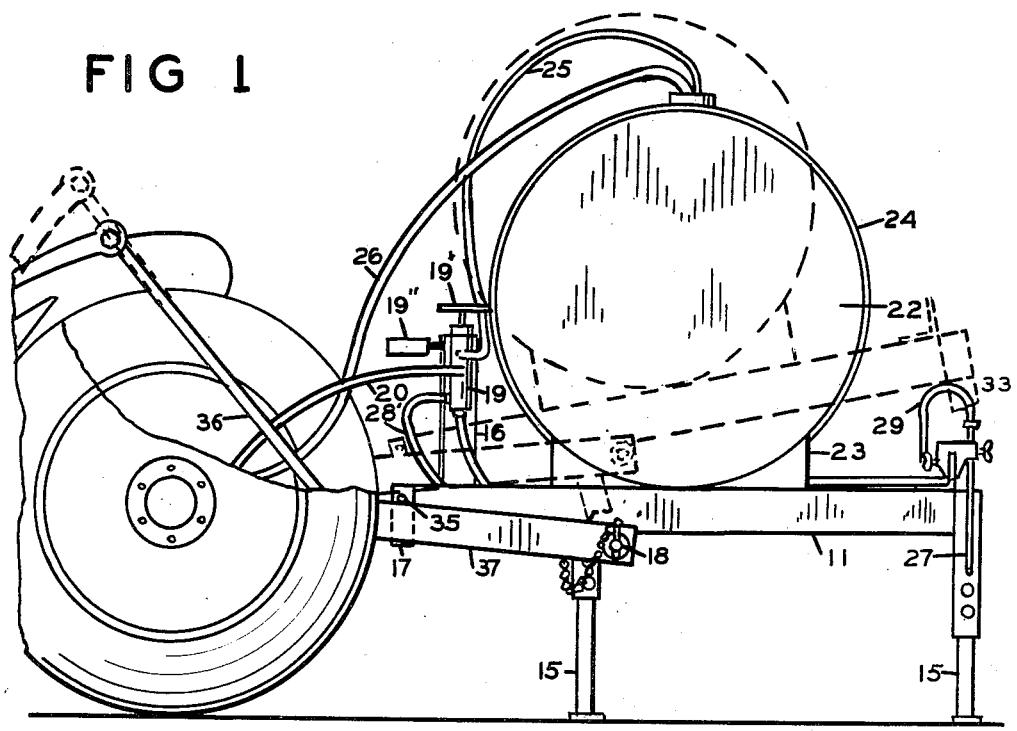

ATTORNEY

UNITED STATES PATENT OFFICE 2,599,448

SPRAYING ATTACHMENT FOR TRACTORS

William Howard Hamilton, Rome, and Scott Causey Hampton, Jr., Adairsville, Ga.

Application August 22, 1951, Serial No. 243,122

6 Claims. (Cl. 299—30)

This invention relates to a spraying attachment for tractors and the like, and more particularly to such an attachment which is quickly and easily attached and detached.

It is well known to those experienced in the art that considerable time is lost whenever it is desired to mount the present day spraying attachments on tractors. This loss of time is due to the complicated mechanism associated with these devices. Additional delays caused by prior art spraying attachments are often due to the fact that most, if not all, of them require the efforts of several men to attach them to a tractor or to remove them. Another disadvantage of spraying attachments now found on tractors is that they are difficult to use on farms containing rocks, stumps or other obstructions that may be found on fields that are otherwise good for farming. This inability to use spraying attachments where there are obstructions is due to the fact that there is no convenient way to lift them.

It is therefore an object of our invention to provide a spraying attachment for tractors and the like that one man can attach to his farm tractor with but little more effort than is required to back the tractor into the front of the spraying attachment.

Another object of our invention is to provide a spraying attachment in which vertical movement is controlled by the usual hydraulic lifting device found on most modern day farm tractors.

Another object of our invention is to provide a spraying attachment having a minimum number of parts, thus having a low manufacturing and maintenance cost, as well as requiring a minimum of skill to operate.

Still another object of this invention is to provide a spraying attachment in which the nozzles may be readily adjusted to any desired height above the ground or at any desired angle.

Other and further objects and advantages of our invention will be apparent from the following description taken in connection with the accompanying drawings in which like characters of reference designate corresponding parts throughout the several views, and wherein:

Fig. 1 is a side view of an embodiment of our invention in a spraying attachment.

Fig. 2 is a top plan view of the attachment shown in Fig. 1.

Figure 7:
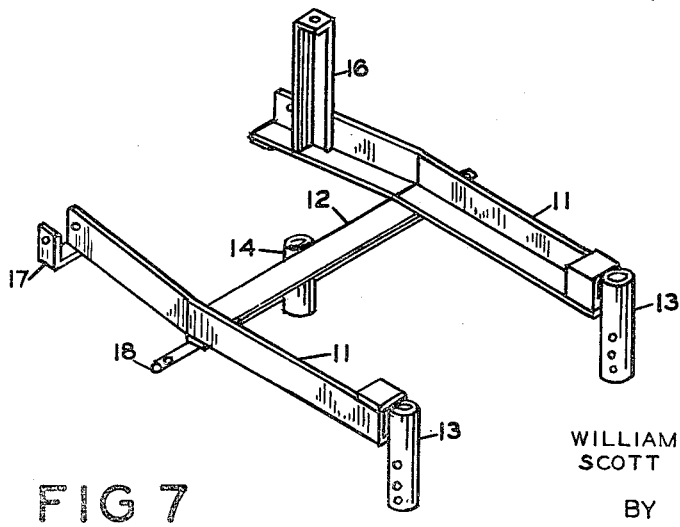
Fig. 7 is an isometric view of the supporting framework.

Referring to the embodiment of our invention chosen for purpose of illustration, it will be seen that our device consists of an H-shaped frame having two parallel side members 11 connected together intermediate their ends by a cross member 12. A tubular fitting 13 is attached to the rear end of each side member 11. A similar fitting 14 is attached to the center of cross member 12, as clearly shown in both Figs. 2 and 7 of the appended drawings, to form a tripod. Fittings 13 and 14 carry adjustable supports 15 that telescope into the tubular fittings to adjustably support this attachment above ground whenever it is not connected to a tractor or other farm implement. A control valve support 16 is mounted on the front end of one of the side members 11. U-shaped attaching lugs 17, safety bolts 17' and pivot rod 18 go to complete the make-up of the major portion of this H-shaped frame though certain other parts will be added as hereinafter described. Pivot rod 18 is welded or otherwise fixed beneath the cross member 12 so that its ends project beyond the side members.

As previously stated, the H-shaped frame has as part of its structure, a control valve support 16. A control valve 19, complete with hand control wheel 19' and pressure gauge 19'', is suitably attached to the support 16. A flexible fluid delivery hose 20 connects the control valve 19 with a pump 21 of known construction. The pump 21 is of the floating type and is attached to the power take-off shaft of the tractor.

Drum 22, in which is placed fluid for spraying, is supported on the already described H-shaped frame by means of supporting blocks 23 to which it is held by bands 24 in the customary manner. Fluid overflow hose line 25 connects the control valve 19 with drum 22, and fluid supply hose line 26 connects drum 22 to pump 21 which receives the spraying liquid through this line from the drum.

Spraying fluid flows from the control valve 19 to spray nozzles 27 by means of pipes 28 and 28'. Pipe 28 feeds the nozzles on the right hand side of this device while pipe 28' feeds the nozzles on the left hand side. The nozzles 27 are connected to fluid supply pipes 28 and 28' by means of flexible tubing 29 to permit adjustment of the nozzles.

Figure 3:
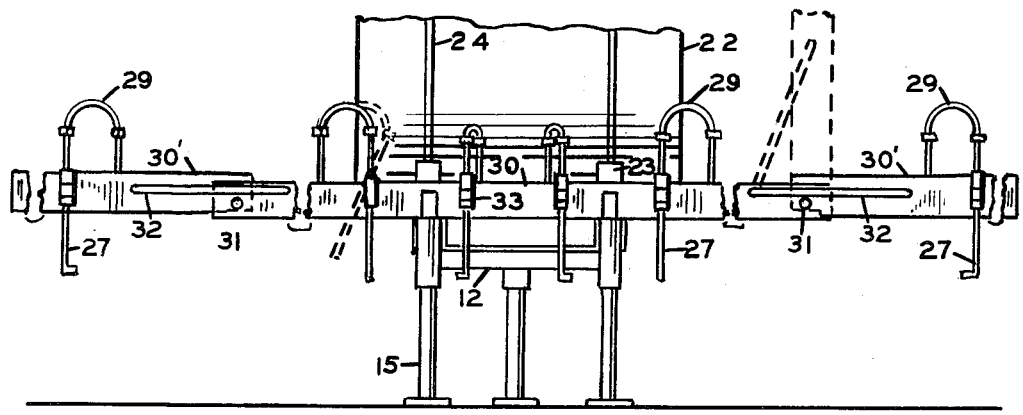
Fig. 3 is a rear view of the attachment shown in Fig. 1.
Figure 4:
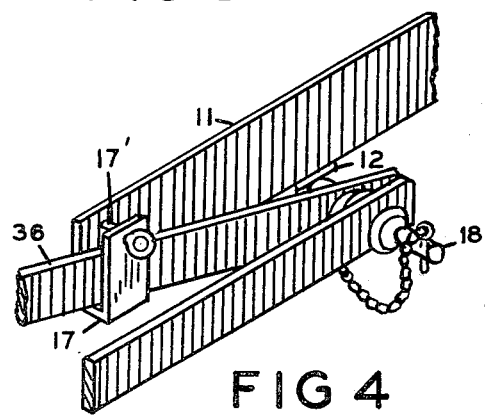
Fig. 4 is an isometric view of a detail.

Nozzle support beam 30 is mounted transversely across the rear of the H-shaped frame to which it is suitably attached, and it is provided with hinged portions 30' at each of its outer ends. Each hinged portion 30' pivots in a vertical plane about its hinge pin 31 as indicated by broken lines in Fig. 3 of the appended drawings. The hinged portions 30' are given additional rigidity when set in a vertical position by means of the bracing effect obtained through brace rods 32.

Figure 5:
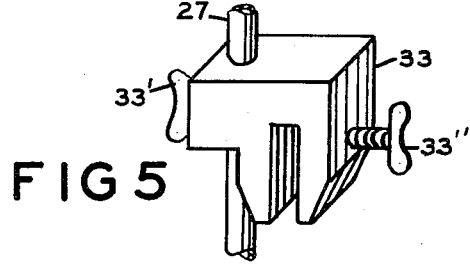
Fig. 5 is an enlarged isometric view of another detail.
Figure 6:
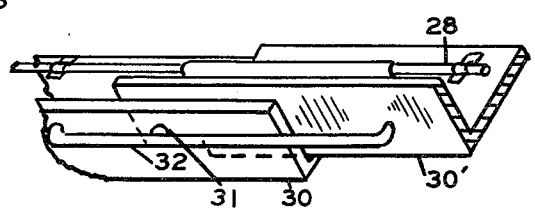
Fig. 6 is an enlarged isometric view of still another detail.

The nozzles 27 are adjustably mounted on the nozzle support beam 30 by means of nozzle blocks 33, the nozzle tube being adjustably held in the block, as shown in Fig. 5, by means of the thumb screw 33', and the block being adjustably held on a flange of the support beam 30 by means of thumb screw 33". By turning the nozzle block, the nozzles may be set at any desired angle, as indicated in broken lines in Fig. 3; and by use of the screws 33' the height of the nozzles may be adjusted individually.

The foregoing description of apparatus delineates applicant's invention and describes the new arrangement of parts which applicants have conceived. The following described apparatus is old and well known in the art but is set forth as equipment with which the applicants' apparatus may be used. For example, it is known that tractors are equipped with pairs of lifting forks 34, 35 which are pivotally mounted on the tractor frame at their inner ends, as at 34', 35', respectively, and have their outer ends brought together at knuckle joints designated at 36. Up and down movement of the lifting forks is accomplished by means of lifter arms 37 which are pivotally connected thereto and which receive their power from the hydraulic lift mechanism customarily found on tractors and which is controlled by means of a control handle such as that indicated at 38 which operates in a segment 39.

In order to mount our attachment on a tractor when our attachment is resting upon its own supports 15, it is merely necessary to back the tractor into the position shown in Fig. 2 whereby the knuckle joints 36 may be slipped over the ends of pivot rod 18 while the lifting forks 35 are placed into the U-shaped attaching lugs 17. After the knuckle joints 36 have been slipped over the projecting ends of the pivot rod 18 and secured in place by suitable cotter keys or pins, as the handle 38 of the hydraulic lift mechanism is moved so as to raise the lifting forks 34, 35, our attachment will be pivotally supported upon the rod 18; and the weight of the tank 22 will cause the forward end of the attachment to tilt upwardly so that the lifting forks 35 will bear firmly against the bottom of the U-shaped attaching lugs 17. In this position, locking pins or safety bolts 17' can be inserted through the U-shaped attaching lugs 17 and over the top of the lifting forks 35 so as to prevent accidental dislodgement of the lifting forks 35 from the attaching lugs. This is all that is necessary to be done in order to completely support our attachment upon the lifting mechanism of the tractor. The support 15 may now be removed from the fittings 13, 14 and inverted for insertion into the top of these tubular fittings, if desired, in order to carry the supports about with the attachment.

The hinged portions 30' at each of the outer ends of the nozzle support beam 30 may be folded upwardly to provide roadability for this otherwise extremely wide piece of farm equipment, and our attachment can be lifted, if desired, to the extreme upward limit of movement of the lifting forks 34, 35. In this position, our attachment can be carried about from place to place by the tractor. When the tractor has reached the field in which spraying is to be accomplished, and with the pump 21 floating on the power take off shaft of the tractor, as power is applied thereto in the usual manner, the pump 21 will pump fluid from the tank 22 through fluid supply hose line 26 and delivery hose 20 to the control valve 19, which is then adjusted by hand wheel 19 to regulate the pressure on the nozzles 27, as indicated on the gauge 19". The control valve 19 is of ordinary construction and operates to control the nozzle pressure by shunting more or less of the fluid back into the tank 22 through fluid overflow hose line 25.

While the spraying is taking place, the hinged portions 30' of the nozzle support beam 30 are carried in the horizontal position, and the height of the nozzles above ground may be adjusted at will by adjustment of the control lever 38. Individual adjustment of the nozzles is accomplished, as heretofore explained, the adjustment of the nozzles in the nozzle blocks 33, and by adjustment of the nozzle blocks on the nozzle support beam. It is of course apparent that our attachment may be easily removed from the tractor by simply reversing the procedure outlined above for attaching our device to a tractor.

Having thus described our invention, it will be obvious to those skilled in the art that we have provided an attachment of great convenience and usefulness, and that while we have illustrated and described our invention in a single practical embodiment thereof, various changes and adaptations may be made without departing from the scope of our invention as described in the following claims.

We claim:

1. In a spraying attachment for a tractor having hydraulically operating lifting forks and a power take-off shaft, an H-shaped frame, a central support mounted at the center of said frame, rear supports mounted on the rear ends of said frame, attaching lugs on the front ends of said frame forming channels open at the top for receiving said lifting forks, a pivot rod mounted beneath said frame and having ends projecting beyond the sides thereof for pivotally attaching said frame to said lifting forks, a drum for liquid to be sprayed mounted transversely upon said frame, a pump arranged to receive power from said power take-off shaft and having an inlet connected to said drum, a nozzle support beam mounted transversely across the rear ends of said side frame members, nozzles supported upon said beam, said beam having foldable end sections, said nozzles being connected to receive liquid from said pump, and a valve connected to control flow of liquid from said pump to said nozzles.

2. In a spraying attachment for a tractor having hydraulically operated lifting forks and a power take-off shaft, a pair of side frame members having forward and rear ends, a cross frame member connecting said side frame members together intermediate their ends to form an H-shaped frame, a central support mounted at the center of said cross frame member, rear supports mounted on the rear ends of said side frame members, attaching lugs on the front ends of said side frame members forming channels open at the top for receiving said lifting forks, a pivot rod mounted beneath said cross frame member and having ends projecting beyond said side members for pivotally attaching said frame to said lifting forks, a drum for liquid to be sprayed mounted transversely upon said frame, a pump arranged to receive power from said power take-off shaft and having an inlet connected to said drum, a nozzle support beam mounted transversely across the rear ends of said side frame members, nozzles individually and adjustably supported upon said beam, said beam having foldable end sections, said nozzles being connected to receive liquid from said pump, and a valve connected to control flow of liquid from said pump to said nozzles.

3. In a spraying attachment for a tractor having hydraulically operated lifting forks and a power take-off shaft, a pair of side frame members having forward and rear ends, a cross frame member connecting said side frame members together intermediate their ends to form an H-shaped frame, a tubular central support fitting mounted at the center of said cross frame member, tubular rear support fittings mounted on the rear ends of said frame members, adjustable supports telescoped into said central support fitting and said rear support fittings, attaching lugs on the front ends of said side frame members forming U-shaped channels open at the top for receiving said lifting forks, a pivot rod mounted beneath said cross frame member and having ends projecting beyond said side members for pivotally attaching said frame to said lifting forks, a drum for liquid to be sprayed mounted transversely upon said frame with its center of gravity between said central support fitting and said rear support fittings, a pump arranged to receive power from said power take-off shaft and having an inlet connected to said drum, a nozzle support beam mounted transversely across the rear ends of said side frame members, nozzles individually and adjustably supported upon said beam, said beam having end sections foldable upwardly, said nozzles being connected to receive liquid from said pump, and a valve connected to control flow of liquid from said pump to said nozzles.

4. In an attachment for a tractor having hydraulically operated lifting forks and a power take-off shaft, an H-shaped frame, a central support mounted at the center of said frame, rear supports mounted on the rear ends of said frame, attaching lugs on the front ends of said frame forming channels open at the top for receiving said lifting forks, and a pivot rod mounted beneath said frame and having ends projecting beyond the sides thereof for pivotally attaching said frame to said lifting forks.

5. In an attachment for a tractor having hydraulically operated lifting forks and a power take-off shaft, a pair of side frame members having forward and rear ends, a cross frame member connecting said side frame members together intermediate their ends to form an H-shaped frame, a central support mounted at the center of said cross frame member, rear supports mounted on the rear ends of said side frame members, attaching lugs on the front ends of said side frame members forming channels open at the top for receiving said lifting forks, and a pivot rod mounted beneath said cross frame member and having ends projecting beyond said side members for pivotally attaching said frame to said lifting forks.

6. In an attachment for a tractor having hydraulically operated lifting forks and a power take-off shaft, a pair of side frame members having forward and rear ends, a cross frame member connecting said side frame members together intermediate their ends to form an H-shaped frame, a tubular central support fitting mounted at the center of said cross frame member, tubular rear support fittings mounted on the rear ends of said side frame members, adjustable supports telescoped into said central support fitting and said rear support fittings, attaching lugs on the front ends of said side frame members forming U-shaped channels open at the top for receiving said lifting forks, and a pivot rod mounted beneath said cross frame member and having ends projecting beyond said side members for pivotally attaching said frame to said lifting forks.

WILLIAM HOWARD HAMILTON.
SCOTT CAUSEY HAMPTON, Jr.

REFERENCES CITED

The following references are of record in the file of this patent:

UNITED STATES PATENTS

| Number | Name | Date |
|---|---|---|
| 2,379,797 | Gilbert | July 3, 1945 |
| 2,462,588 | Wondra | Feb. 22, 1949 |
| 2,517,304 | Greening | Aug. 1, 1950 |
| 2,524,048 | Furnas | Oct. 3, 1950 |
| 2,545,236 | Lesniak | Mar. 13, 1951 |
| 2,546,472 | O'Connor | Mar. 27, 1951 |
| 2,551,896 | Notestein | May 8, 1951 |